United States Patent [19]

Zrinscak

[11] 4,400,307

[45] Aug. 23, 1983

[54] PROCESS FOR THE REDUCTION OF THE EFFECT OF CONTAMINANT METALS IN CRACKING CATALYSTS

[75] Inventor: Fred S. Zrinscak, Woodbury Heights, N.J.

[73] Assignee: Mobil Oil Corporation, New York, N.Y.

[21] Appl. No.: 275,001

[22] Filed: Jun. 18, 1981

[51] Int. Cl.³ .......................... B01J 29/16; B01J 37/20
[52] U.S. Cl. .................................. 252/455 Z; 252/439
[58] Field of Search .................. 252/455 Z, 436, 439; 208/120

[56] References Cited

U.S. PATENT DOCUMENTS 3,239,451 3/1966 Young .............................. 252/455 Z
3,471,412 10/1969 Miale et al. ...................... 252/455 Z
4,257,919 3/1981 Roberts et al. .................. 252/455 Z

*Primary Examiner*—Carl F. Dees
*Attorney, Agent, or Firm*—Alexander J. McKillop; Michael G. Gilman; Charles J. Speciale

[57] ABSTRACT

The deleterious effects of contaminant metals present in feeds to a catalytic cracker can be reduced to a greater extent than that obtainable with conventionally practiced passivation techniques utilizing antimony treated catalysts by pretreating the catalyst with hydrogen sulfide.

3 Claims, No Drawings

PROCESS FOR THE REDUCTION OF THE EFFECT OF CONTAMINANT METALS IN CRACKING CATALYSTS

BACKGROUND OF THE INVENTION

This invention relates to the passivation of metals on a cracking catalyst and, more particularly, is directed towards a novel process for enhancing catalytic performance by an improved process for prevention of the detrimental effects of metals, such as nickel, vanadium, and iron on the activity of a cracking catalyst when the same is used in a cracking process having essentially no hydrogen added thereto and wherein the cracking catalyst has been treated with antimony metal or a compound of antimony prior to subjecting the cracking catalyst to hydrocarbon cracking conditions.

DESCRIPTION OF THE PRIOR ART

It is well known in the art that hydrocarbon feedstocks containing varying amounts of metals, such as nickel, vanadium, and iron cause deterioration of the cracking catalyst during the cracking process. In fact, some oils contain these metals in such a high concentration that they cannot be economically cracked into gasoline or other motor fuels without some sort of pretreatment. The metals accumulate on the cracking catalyst and cause increased hydrogen production and coke laid down on the cracking catalyst, thereby adversely effecting the yield of desired products. There has been much activity in the patent and technical literature in recent years on methods of preventing the detrimental effects of metals, such as nickel, vanadium and iron on the performance of cracking catalysts involving treatment of a cracking catalyst with antimony metal or a compound of antimony prior to subjecting the cracking catalyst to hydrocarbon cracking conditions. In fact, U.S. Pat. Nos. 3,711,422; 4,025,458; 4,031,002; 4,111,845; 4,148,714; 4,153,536; 4,166,806; 4,190,552; 4,198,317; 4,238,362; and 4,255,287 are all directed towards methods of preparing improved hydrocarbon conversion catalysts wherein the adverse effects of metal, such as nickel, vanadium, iron, copper, and cobalt in a cracking catalyst are mitigated by contacting the catalyst during some stage of its use with either antimony or a compound thereof, with or without the addition of an additional metal, such as tin. The disclosure of all of said patents is herein incorporated by reference.

The instant invention is also concerned with hydrocarbon cracking catalysts which have been treated with antimony or a compound thereof in order to result in increased passivation towards the contaminating metals, but it represents a further improvement on the basic technology with regard to antimony treatment in that, quite unexpectedly it has been found that if an antimony containing solid acidic solid catalyst is treated with hydrogen sulfide that enhanced resistance to metal contamination is achieved.

DESCRIPTION OF THE PREFERRED EMBODIMENTS

As has heretofore been stated, it is already known in the art that antimony or compounds thereof are advantageous in enhancing the effectiveness of hydrocarbon cracking catalysts which have become impaired by deposition thereon of the metal contaminant. As is known in the prior art, the form in which the antimony is present in the cracking catalyst or is employed in the preparation of the antimony containing catalyst is not critical. Thus, elemental antimony, inorganic antimony compounds, and organic antimony compounds, as well as mixtures thereof are suitable sources of antimony. The term "antimony" generally refers to any one of these antimony sources. Examples of some inorganic antimony compounds which can be used include antimony oxides, such as antimony trioxide, antimony tetraoxide, and antimony pentaoxide.

The form in which antimony is present in the cracking catalyst or is employed in the preparation of the antimony-containing catalysts is not critical. Thus, elemental antimony, inorganic antimony compounds, and organic antimony compounds as well as mixtures thereof, are suitable sources of antimony. The term "antimony" generally refers to any one of these antimony sources. Examples of some inorganic antimony compounds which can be used include antimony oxides such as antimony trioxide, antimony tetroxide, and antimony pentoxide; antimony sulfides such as antimony trisulfide and antimony pentasulfide; antimony selenides such as antimony triselenide; antimony tellurides such as antimony tritelluride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride, and antimony pentachloride; antimonyl halides such as antimonyl chloride and antimonyl trichloride; antimonides such as indium antimonide; and the like. Of the inorganic antimony compounds, those which do not contain halogen are preferred. Although organic antimony compounds for use in the preparation of the antimony-containing catalysts preferably contain about 3 to about 54 carbon atoms for reasons of economics and availability, organic antimony compounds outside this range also are applicable. Thus, organic polymers containing antimony can be employed as the organic antimony compound. In addition to carbon and hydrogen, the organic antimony compound can contain elements such as oxygen, sulfur, nitrogen, phosphorus, or the like. Examples of some organic antimony compounds which can be used in the preparation of the antimony-containing catalysts include antimony carboxylates such as antimony triformate, antimony triacetate, antimony tridodecanoate, antimony trioctadecanoate, antimony tribenzoate, and antimony tris(cyclohexanecarboxylate); antimony thiocarboxylates such as antimony tris(thioacetate), antimony tris(dithioacetate) and antimony tris(dithiopentanoate); antimony thiocarbonates such as antimony tris(O-propyl dithiocarbonate); antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate), and antimony tris(butylthiocarbamate); antimony phosphites such as antimony tris(diphenyl phosphite); antimony phosphates such as antimony tris(- dipropyl phosphate); antimony thiophosphates such as antimony tris(O,O-dipropyl thiophosphate) and antimony tris(O,O-dipropyl dithiophosphate); and the like. Mixtures of two or more applicable substances comprising antimony can be employed.

As is also well known in the art, the quantity of antimony used to treat the hydrocarbon cracking catalyst in order to obtain improved performance is not narrowly critical and usually ranges from about 0.01 to 8 weight percent, preferably about 0.02 to 2% of antimony based on catalyst. These concentrations are expressed as the element and are based on the weight of catalyst prior to treatment.

The hydrocarbon cracking catalyst to which this invention is applicable are acidic solids well known in the art and the term "cracking catalyst" refers to cracking catalyst materials that are useful for cracking hydrocarbons in the absence of added hydrogen. The conventional cracking catalysts are acidic solids generally containing silica, or silica-alumina, and such materials are frequently associated with zeolitic materials. The zeolitic materials can be naturally occurring or they can be produced by conventional ion exchange methods so as to provide metallic ions which improve activity of the catalyst. The zeolite modified silica-alumina catalysts are particularly applicable in this invention. Examples of cracking catalysts to which antimony alone or antimony in combination with tin can be incorporated include hydrocarbon conversion catalysts obtained by mixing inorganic oxide gels with an aluminosilicate, said aluminosilicate compositions which are strongly acidic as a result of treatment with a fluid medium containing at least one rare earth metal cation and a hydrogen ion or ion capable of conversion to a hydrogen ion. Although a wide variety of aluminosilicates can be employed which generally have pore sizes ranging from 6 to about 13 Angstrom units. The particularly preferred aluminosilicates are those of the faujasite variety which are commonly identified as zeolite X or zeolite Y.

As has heretofore been stated, the novel process of this invention simply resides in treatment of an antimony containing acidic solid cracking catalyst with hydrogen sulfide in order to enhance its catalytic performance and to reduce the deleterious effects of contaminant metals over the untreated hydrogen sulfide catalyst. The treatment with hydrogen sulfide is not narrowly critical and is carried out by contacting an antimony containing cracking catalyst with hydrogen sulfide at temperatures ranging from 850° F. to 1350° F. and pressures ranging from 0 1 psig 40 psig for a period of time ranging from five seconds to 300 seconds. It is to be understood that the hydrogen sulfide can be used as is or in admixture with an inert gas.

The exact point at which the antimony containing cracking catalyst is contacted with hydrogen sulfide is also not narrowly critical. Although the most common method would be to pretreat the catalyst with hydrogen sulfide prior to introduction into a cracking unit, such is not the only method of accomplishing the improved results. Thus, for example, hydrogen sulfide could be introduced into any portion of a fluid cracker or TCC cracker usually with a steam seal in order to prevent migration back. A similar effect might also be possible by adding organic sulfur-type compounds to the hydrocarbon feed in order that the sulfur be converted in situ to hydrogen sulfide. Many other modifications are possible within the scope of this invention, including for example, the addition to the cracking catalyst of a combustion promoter such as a platinum group metal or chromium, as well as introducing to the cracking unit which contains a large pore size crystalline material, such as the faujasite type previously referred to, a small amount of material of the ZSM-5 type.

The following examples will illustrate the novel process of this invention.

In all the examples which follow, the cracking catalyst employed was a Y sieve which had been base exchanged with rare earth chloride, then calcined and composited with silica-alumina and base exchanged with $Al_2SO_4$ to 7.2–12.0 weight percent rare earth. In Examples 2, 3, and 4, the base cracking catalyst was subsequently equilibrated in a residual feed-type operation, which severely metal poisoned the catalyst. The catalyst contained 830 ppm Ni and 2,000 ppm V.

The metal poisoned catalyst was impregnated with antimony tris(O,O-dipropyl dithiophosphate) which is commercially available under the trademark VAN-LUBE 622 from the Vanderbilt Corporation, as follows:

1. VANLUBE 622 was diluted with cyclohexane so that total amount of antimony was sufficient to deposit desired amount of antimony on catalyst samples.
2. Stir catalyst in mixture in crucible on hot plate at 200 watt setting and heat lamp 10" away until catalyst looks dry.
3. Increase hot plate setting to 500 watts and continue to stir for 10 minutes, then cool and store for use.

Examples 5 and 6 represent the novel process of this invention wherein the catalysts of Example 3 were further treated with hydrogen sulfide. In Example 5 the treatment was carried out at 1000° F. and atmospheric pressure for 100 seconds and in Example 6 the treatment was carried out at 1000° F. and atmospheric pressure for 300 seconds.

All the above materials including the base material were then evaluated for cracking a 925° F.+ vacuum residuum blended with a 650° F.+ MDDW cracked bottoms having the following characteristics.

DETAILED FEEDSTOCK PROPERTIES OF BLEND

28 Vol. % of 925° F.+ Vacuum Tar+72 Vol. % of 650+ Cracked Bottoms Fraction MDDW

| Properties | |
|---|---|
| Gravity, °API at 60° F. | 25.2 |
| Pour Point, °F. | 90 |
| Carbon Residue, % wt. (CCR) | 2.31 |
| KV at 130° F., centistokes | 81.26 |
| KV at 100° C., centistokes | 7.910 |
| Refractive Index at 70° C. | 1.4969 |
| Sulfur, % wt. | 0.26 |
| Nitrogen, Total, % wt. | 0.06 |
| Nitrogen, Basic, ppm | 335 |
| Hydrogen, % wt. | 12.33 |
| Bromine Number | 3.6 |
| Density at 70° C. | 0.8798 |
| Metals, ppm Ni | 1.25 |
| V | 1.07 |
| Fe | 4.51 |
| Cu | 0.34 |
| Na | 5.96 |
| Molecular weight | 413 |
| Distillation, D-1160-1, °F. | |
| IBP | 629 |
| 5,% vol. | 663 |
| 10% vol. | 681 |
| 20% vol. | 705 |

-continued

| | |
|---|---|
| 30% vol. | 724 |
| 40% vol. | 746 |
| 50% vol. | 769 |
| 60% vol. | 794 |
| 70% vol. | 820 |
| 80% vol. | 869 |
| 90% vol. | 949 |
| 95% vol. | 1001 |
| Composition, % wt. | |
| Paraffins | 30 |
| Naphthenes | 22 |
| Aromatics | 48 |
| $C_A$ (Mass spec) | 18.5 |
| $C_A$ (n-d-m) | 24.2 |

Conversion was carried out at 875° F., 1.5 LHSV 4.0 Cat-to-Oil ratio, and at atmospheric pressure. The results obtained are shown in the following table wherein each experiment was run at least in duplicate and the individual results, as well as the average of the runs are set forth in the following table:

TABLE

| | $H_2/(C_1 + C_2)$ Mole Ratio | Coke % Wt | $H_2$ % Wt | Dry Gas % Wt | Gas Gravity | Conv. % Vol. |
|---|---|---|---|---|---|---|
| Base | | | | | | |
| Run 1 | 3.91 | 6.6 | 0.31 | 3.6 | 0.950 | 46.3 |
| Run 2 | 3.85 | 6.8 | 0.33 | 3.9 | 1.005 | 47.8 |
| Average | 3.88 | 6.7 | 0.32 | 3.8 | 0.978 | 47.1 |
| 500 ppm Sb | | | | | | |
| Run 1 | 2.82 | 5.9 | 0.22 | 3.5 | 1.100 | 46.1 |
| Run 2 | 3.12 | 6.3 | 0.28 | 3.8 | 1.005 | 45.6 |
| Average | 2.97 | 6.1 | 0.25 | 3.7 | 1.053 | 45.9 |
| 1000 ppm Sb | | | | | | |
| Run 1 | 2.85 | 6.0 | 0.23 | 3.5 | 1.045 | 43.5 |
| Run 2 | 2.97 | 6.2 | 0.27 | 3.8 | 1.035 | 45.3 |
| Average | 2.97 | 6.1 | 0.25 | 3.7 | 1.040 | 44.4 |
| 1500 ppm Sb | | | | | | |
| Run 1 | 2.73 | 6.0 | 0.24 | 3.4 | 1.070 | 44.5 |
| Run 2 | — | — | — | — | 1.060 | — |
| Run 3 | 2.93 | 6.0 | 0.25 | 3.5 | 1.075 | 44.7 |
| Average | 2.83 | 6.0 | 0.25 | 3.5 | 1.068 | 44.6 |
| 1000 ppm Sb; 100 Sec $H_2S$ | | | | | | |
| Run 1 | 2.03 | 5.4 | 0.15 | 3.1 | 1.110 | 42.4 |
| Run 2 | 1.98 | 5.3 | 0.15 | 3.1 | 1.115 | 42.3 |
| Average | 2.01 | 5.4 | 0.15 | 3.1 | 1.115 | 42.4 |
| 1000 ppm Sb; 300 sec $H_2S$ | | | | | | |
| Run 1 | 1.77 | 5.2 | 0.15 | 3.3 | 1.170 | 43.1 |
| Run 2 | 1.65 | 5.1 | 0.13 | 3.2 | 1.170 | 43.3 |
| Average | 1.71 | 5.2 | 0.14 | 3.3 | 1.170 | 43.2 |

As can be seen, operations with the base catalyst were significantly improved by the addition of antimony as is acknowledged in the prior art. Thus, Examples 2, 3 and 4 all resulted in a lower gas factor, a lower coke make, and a lower hydrogen make than the case catalyst. However, when the results of Examples 5 and 6 are compared to Example 3, it can be seen that the novel process of this invention resulted in an even more drastic improvement. Thus, for example, please note that in Examples 5 and 6, i.e. wherein the catalysts have been treated with hydrogen sulfide, even a more drastic improvement occurred with regard to hydrogen factor, coke, hydrogen, and dry gas than had been possible with the prior art catalysts.

What is claimed is:

1. A cracking catalyst suitable for cracking hydrocarbons comprising an acidic solid which has incorporated therein antimony or a compound thereof to passivate contaminating metals, said catalyst having been treated with hydrogen sulfide effective to further enhance resistance of the antimony-containing acidic solid to metal contamination.

2. The catalyst of claim 1 wherein said antimony-containing catalyst comprises a crystalline aluminosilicate zeolite.

3. The catalyst of claim 2 wherein said crystalline aluminosilicate is of the Y type zeolite.

* * * * *